UNITED STATES PATENT OFFICE.

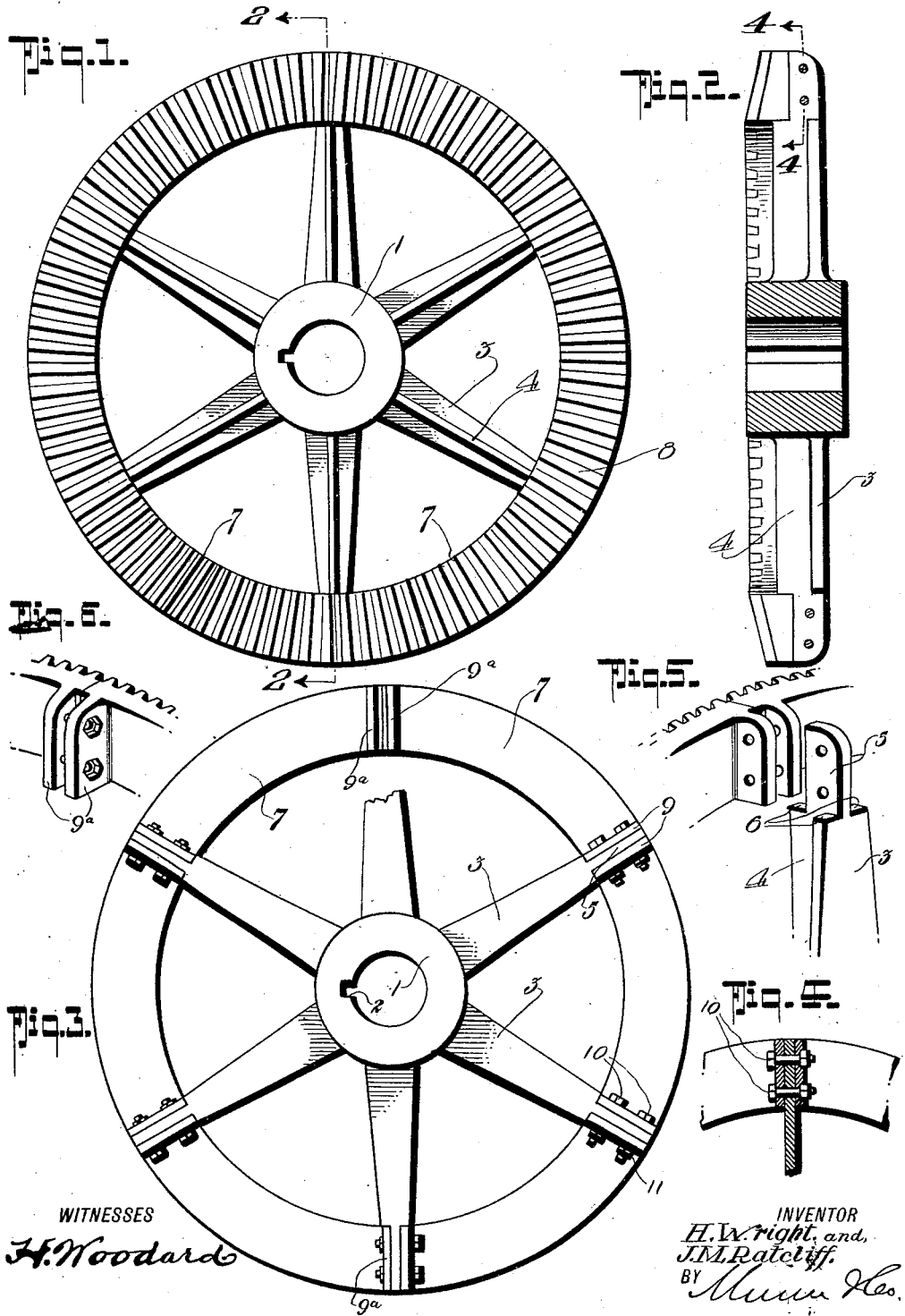

HARVEY W. WRIGHT AND JOHN M. RATCLIFF, OF FLORENCE, ALABAMA.

GEAR-WHEEL.

1,312,818.  Specification of Letters Patent.  Patented Aug. 12, 1919.

Application filed November 22, 1918. Serial No. 263,700.

*To all whom it may concern:*

Be it known that we, HARVEY W. WRIGHT and JOHN M. RATCLIFF, citizens of the United States, and residents of Florence, in the county of Lauderdale and State of Alabama, have invented certain new and useful Improvements in Gear-Wheels, of which the following is a specification.

Our invention is an improvement in gear wheels, and has for its object to provide a device of the character specified wherein the rim is sectioned and detachably connected to the spokes, which are cast or otherwise formed with the hub, thus eliminating a considerable expense and labor in the formation of the wheel.

In the drawings:

Figure 1 is a front view of the improved wheel,

Fig. 2 is a section on line 2—2 of Fig. 1,

Fig. 3 is a rear view of the wheel,

Fig. 4 is a section on the line 4—4 of Fig. 2, both Figs. 2 and 4 looking in the direction of arrows adjacent to the respective lines.

Fig. 5 is a perspective view of one of the connections between a spoke and the rim, and Fig. 6 is a similar view of the abutting ends of the rim sections looking in the opposite direction to Fig. 5.

In the present embodiment of the invention, the improved wheel consists of a hub 1, which may have the usual keyway 2, and has spokes 3, radiating therefrom. Each of these spokes is T-shape in cross section, *i. e.*, each may be considered as having a radially extending central reinforcing rib or web 4 on its front face, and the outer end of each spoke is cut away at opposite sides as is also the web 4 to form a species of tenon 5. Thus three shoulders 6 are formed by the cutaway on the spoke and web between the tenon and the body of the spoke. The rim consists of similar semicircular sections 7, each of which is provided upon one face with gear teeth 8, and upon the other with pairs of laterally extending lugs 9, the members of each pair of lugs being spaced apart from each other sufficiently far to admit the tenon 5 of a spoke. At its ends each section 7 has a single lug $9^a$, and the lugs $9^a$ are so arranged with respect to the sections that when the meeting ends of the sections are abutted as shown in Figs. 5 and 6, the said lugs $9^a$ will be spaced apart a distance corresponding to the spacing of the lugs 9, *i. e.*, a distance to receive a tenon 5 between them. Each pair of lugs 9 or $9^a$ and the tenon in connection therewith, has registering openings, through which are passed bolts 10, two bolts being provided for each opening. These bolts are engaged by nuts 11, and the rim sections are thus bolted to the spokes, and are also connected to each other.

Referring to the Figs. 3, 4 and 6 of the drawing, it will be noted that the nuts of the bolts 10 have polygonal heads, as, for instance, hexagonal, as shown, and the openings for the nuts in one of the lugs $9^a$ of each pair, and in one of the lugs 9 of each pair, are shaped to receive the nuts so that they are locked by their engagement with the openings.

We claim:

A wheel of the character specified, comprising a hub having radial spokes, and a rim detachably connected with the ends of the spokes, the rim consisting of similar sections, the connections between the sections being at the spokes, said connection between the spokes and the rim comprising pairs of spaced lugs extending laterally from the face of the rim, the spokes having tenons fitting between the members of the pairs, the tenons and lugs having registering openings, and bolts for engaging the openings.

HARVEY W. WRIGHT.
JOHN M. RATCLIFF.

Copies of this patent may be obtained for five cents each, by addressing the "Commissioner of Patents, Washington, D. C."